US007182268B2

(12) United States Patent
Kawahara

(10) Patent No.: US 7,182,268 B2
(45) Date of Patent: Feb. 27, 2007

(54) METHOD OF CONTROLLING THE ABSOLUTE HUMIDITY OF AIR STREAM IN KILNING STEP AND KILNING APPARATUS

(75) Inventor: Kazumitsu Kawahara, Tokyo (JP)

(73) Assignee: Sapporo Breweries Ltd., Tokyo (JP)

( * ) Notice: Subject to any disclaimer, the term of this patent is extended or adjusted under 35 U.S.C. 154(b) by 509 days.

(21) Appl. No.: 10/472,200

(22) PCT Filed: Mar. 5, 2002

(86) PCT No.: PCT/JP02/02033

§ 371 (c)(1), (2), (4) Date: Sep. 29, 2003

(87) PCT Pub. No.: WO02/079371

PCT Pub. Date: Oct. 10, 2002

(65) Prior Publication Data

US 2004/0086596 A1 May 6, 2004

(30) Foreign Application Priority Data

Mar. 29, 2001 (JP) ............................ 2001-097087

(51) Int. Cl.
*B01F 3/02* (2006.01)
*G05D 21/00* (2006.01)
*F26B 3/00* (2006.01)

(52) U.S. Cl. ..................... 236/44 A; 236/44 R; 34/474

(58) Field of Classification Search ............. 236/44 R, 236/44 A, 44 C, 49.1, 49.3; 34/474, 537, 34/557

See application file for complete search history.

(56) References Cited

U.S. PATENT DOCUMENTS 4,221,058 A * 9/1980 Zagorzycki .................. 34/557

(Continued)

FOREIGN PATENT DOCUMENTS

DE 34 33 157 4/1986

(Continued)

OTHER PUBLICATIONS

D. E. Steinmann, Solar Energy, vol. 54, No. 5, XP-004013365, pp. 309-315, “Real-Time Simulation of Solar Kiln Drying of Timber”, May 1, 1995.

*Primary Examiner*—Chen Wen Jiang
(74) *Attorney, Agent, or Firm*—Oblon, Spivak, McClelland, Maier & Neustadt, P.C.

(57) ABSTRACT

The present invention relates to a method of controlling the absolute humidity of blown air in a roasting-and-drying process and a roasting-and-drying apparatus. The method makes humidity control for air blown through malt to be proper and makes the variation in the degree of drying to be decreased in the roasting-and-drying process for producing malt. In the process for roasting and drying a malt raw material, outside air introduced toward a malt layer 10 provided by heaping the malt raw material is heated and is fed to the malt raw material as the blown air. A portion of air passing through the malt raw material as circulated air is mixed with the outside air and is fed to the malt raw material as the blown air again. The absolute humidity of the blown air fed to the malt raw material is measured using a sensor 20, and the mixing ratio of the introduced outside air and the circulated air is controlled so that the measured absolute humidity is kept at a predetermined value.

5 Claims, 5 Drawing Sheets

U.S. PATENT DOCUMENTS

| | | | |
|---|---|---|---|
| 4,644,665 A * | 2/1987 | Naunapper et al. | 34/474 |
| 5,325,604 A | 7/1994 | Little | |
| 5,433,019 A * | 7/1995 | Fu et al. | 34/474 |
| 5,637,336 A | 6/1997 | Fulayter | |

FOREIGN PATENT DOCUMENTS

| | | |
|---|---|---|
| DE | 19622551 | 12/1997 |
| EP | 0 022 935 A1 | 1/1981 |
| GB | 2 287 527 A | 9/1995 |
| JP | 57-34442 | 2/1982 |
| JP | 2-13353 | 1/1990 |
| JP | 3-113281 | 5/1991 |
| JP | 7-132076 | 5/1995 |
| JP | 9-159361 | 6/1997 |
| WO | 99/25806 | 5/1999 |

* cited by examiner

MOLLIER DIAGRAM (a) ——————— STANDARD ROASTING-AND-DRYING-PROCESS (b) ----------- ROASTING-AND-DRYING-PROCESS WITH LOW ABSOLUTE HUMIDITY AND FAST DRYING (c) —·—·—·— ROASTING-AND-DRYING-PROCESS WITH HIGH ABSOLUTE HUMIDITY AND SLOW DRYING

METHOD OF CONTROLLING THE ABSOLUTE HUMIDITY OF AIR STREAM IN KILNING STEP AND KILNING APPARATUS

TECHNICAL FIELD

The present invention relates to a method of controlling humidity of blown air in a malt roasting-and-drying process for production of beer, low-malt beer, distilled liquor, etc., and a roasting-and-drying apparatus.

BACKGROUND ART

A production process for beer, low-malt beer, distilled liquor, etc., includes a roasting-and-drying process for drying and roasting green malt provided by germinating barley. The roasting-and-drying process stops the growth and the lytic reaction of green malt that is a raw material by drying the green malt, so as to prevent the putrefaction and the spoilage and to allow the storage of the green malt. Additionally, it is performed in order to eliminate natural odor of green malt and to produce a dye and a flavor.

The roasting and the drying are performed for a short time period such as 1–2 days and nights so as to provide physical and chemical changes that determine the quality and the kind of malt and are the last processes in a malt production process, so that the process control is important for beer production that aims at obtaining a high quality beer. In particular, in the roasting-and-drying process, the drying temperature and speed and the roasting temperature have impacts.

As a roasting-and-drying method, provided are direct-firing roasting-and-drying methods of passing a combustion gas directly through a malt layer in a roasting-and-drying room and indirect hot-air roasting-and-drying methods with indirect heated air. Among the indirect heating methods, one popular method is performed so that air is heated by a heat exchanger and is blown into a green malt layer by an air blower. The air is taken in from outside air and the amount of air necessary to dry a given amount of green malt varies depending on the temperature and the humidity of the air.

The green malt layer, which normally has a height of 0.8 through 1.2 m for a one-floor method or 20 cm–30 cm for a two-floors or three-floors method, is uniformly distributed on a floor, and roasting and drying are controlled by the air blower while a ventilating valve (damper) is controlled to be open or closed.

In a drying process in the roasting-and-drying process, factors such as the temperature, the time period, and further the blown air amount have impacts, as is described above, and, particularly, in large-scale drying equipment, the humidity of outside air has an impact. Of course, the humidity of the outside air varies dependent on weather, and the reason why the degree of the drying varies dependent on weather is that the absolute humidity of the air (that is, the amount of moisture contained in the air; g/L) varies.

Conventionally, in the drying process, the controlling of the temperature, the drying time period, the blown air amount, etc., has been performed so as to accomplish roasting and drying with a constant quality. The controls of the processes have been performed by way of adjusting the taken-in amount of outside air, etc., based on room temperature, room relative humidity, or the relative humidity of the outside air, depending on experience, but the appropriate controls of heating temperature, the blown air amount, etc., have not been based on the absolute humidity of the outside air, and thus there is a need for a drying method capable of finer control and being able to achieve desired roasting and drying.

In the present invention, when heated air is fed to a malt layer in a roasting-and-drying process, the absolute humidity of outside air is continuously monitored, thereby controlling the blown air amount so as to perform more appropriate drying, based on the knowledge that the influence of the variation of the absolute humidity of the outside air, not the relative humidity thereof, on drying is large.

DISCLOSURE OF THE INVENTION

The problems described above can be solved by the following means according to the present invention.

One aspect of the present invention is a method of controlling the absolute humidity of blown air in a roasting-and-drying process for roasting and drying a malt raw material by heating outside air introduced toward a malt layer provided by heaping the malt raw material so as to be fed to the malt raw material as blown air and by mixing a portion of air passed through the malt raw material as circulated air with outside air, so as to be fed to the malt raw material as blown air again, wherein the absolute humidity of the blown air fed to the malt raw material is measured and the mixing ratio of introduced outside air and the circulated air is controlled so that the measured absolute humidity is kept at a predetermined value.

In the present invention, since the amounts of the outside air and the circulated air are adjusted so that the absolute humidity of the blown air is kept at a constant value, a stable drying situation can be provided without the influence of the absolute humidity of the outside air and roasted and dried malt with a stable quality can be obtained.

Also, another aspect of the present invention is a roasting-and-drying apparatus for roasting and drying a malt raw material by heating outside air introduced toward a malt raw material from the underside of a malt layer floor for heaping the malt raw material so as to be fed to the malt raw material as blown air and by mixing a portion of air passing through the malt raw material as circulated air with outside air so as to be fed to the malt raw material as blown air again, comprising an outside-air damper for adjusting the introduction amount of outside air, a circulated-air damper for dividing circulated air passing through the malt raw material into air exhausted outside and recycled air, a humidity sensor for measuring the absolute humidity of blown air fed to the malt raw material, a control device for controlling a mixing ratio of introduced outside air and the circulated air so that the measured absolute humidity is kept at a predetermined value.

Another aspect of the present invention is the roasting-and-drying apparatus described above, wherein the control device controls the outside-air damper and the circulated-air damper so that the sum of the introduced air of outside air and the recycled air is continuously constant.

In the aspects described above, air having the continuously stable absolute humidity can be fed to the malt raw material based on the absolute humidity of the blown air that is fed to the malt raw material and thus roasted and dried malt with a stable quality can be obtained.

BEST MODE FOR CARRYING OUT THE INVENTION

An embodiment is shown below in order to illustrate a roasting-and-drying method according to the present invention more in detail.

Figure 1:
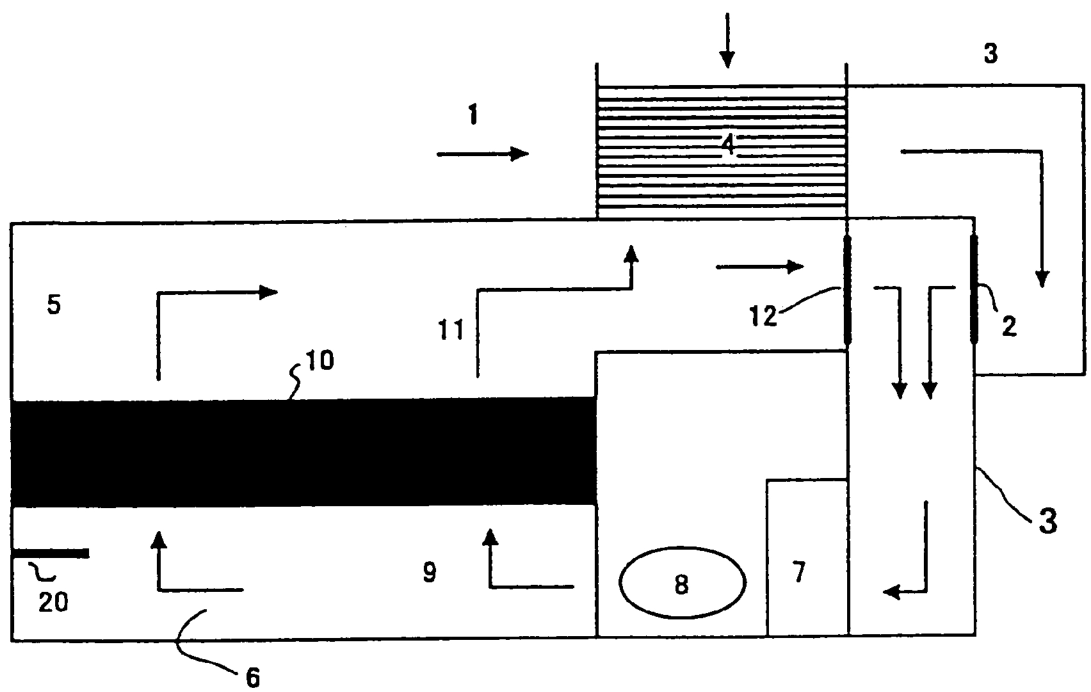
FIG. 1 is a diagram illustrating a roasting-and-drying process according to the present invention.

FIG. 1 is a principle diagram for illustrating a roasting-and-drying method according to the present invention and shows air flow for drying green malt.

A roasting-and-drying apparatus 100 has an outside-air damper 2 for taking outside air 1 in, which is introduced to a passageway (air duct) 3 via the outside-air damper 2. The introduced outside air is led downward by a fan 8 disposed on the underside of a passageway, transferred into an underside room 6 of a roasting-and-drying room 5 via a heat exchanger 7 for heating the introduced air, and fed to a malt layer (green malt) 10 as blown air 9. A portion of air 11 passing through the malt layer 10 returns to the passageway 3 via a circulated-air damper 12 communicating with the passageway 3 as circulated air 11.

The returned portion of the circulated air is recycled and introduced into the underside room 6 under the malt layer 10.

Herein, an air dryer (not shown in FIGS.) is disposed at an outside-air introducing port outside the roasting-and-drying room 5, and when the absolute humidity of the outside air is high, air is dried and introduced from the outside-air damper 2. Additionally, the outside-air damper 2 adjusts the ratio of the amount of introduced outside air and the amount of air exhausted outside of the circulated air returning to the inside of the passageway 3. The circulated-air damper 12 also allows the ratio of the amount of recycled air in the circulated air passing through the malt layer 10 to be adjusted.

Additionally, a humidity sensor 20 capable of measuring the absolute humidity is disposed in the underside room 6 of the drying room. As the humidity sensor 20 for measuring the absolute humidity, various commercially available ones can be used. For example, as a humidity sensor, known is a sensor having a structure in which an electrode for oxygen and an electrode for hydrogen are provided to one zirconia element, whereby electric current proportional to hydrogen vapor is obtained under a certain voltage. Thus, the absolute humidity of air can be measured.

Figure 2:
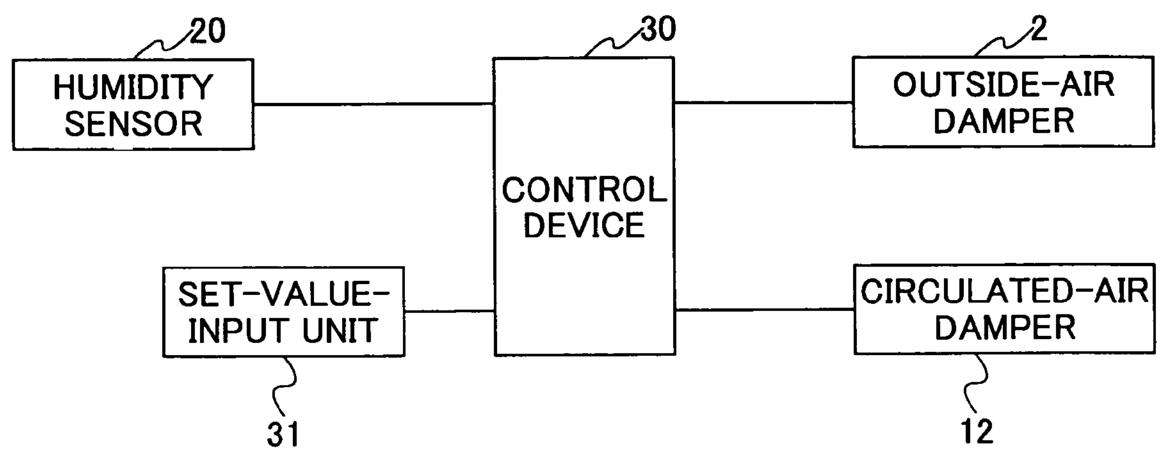
FIG. 2 is a block diagram showing the structure of a control device in a roasting apparatus.

FIG. 2 shows a control device 30 for controlling the blown air amount in a roasting-and-drying apparatus 100. The humidity sensor 20, the outside-air damper 2, and the circulated-air damper 12 are connected to the control device 30. The control device 30 also has a set-value-input unit 31, whereby a desired value for the absolute humidity of blown air can be set. Then, the control device 30 continuously compares the measurement from the humidity sensor 20 with the set value and adjusts the degrees of openings of the damper 2 and the damper 12 due to the result of the comparison.

The basic control method according to the present invention for the roasting-and-drying apparatus 100 with the structure described above is illustrated below.

(1) In a roasting-and-drying process, the absolute humidity of air blown into green malt 10 (blown air) is measured and monitored by the humidity sensor 20.

(2) The degrees of the openings of the outside-air damper 2 and the circulated-air damper 12 are adjusted at every certain time period so that the measuring data for the humidity are set values (desired values) that have been preset. In the adjustments, the mixing ratio of outside air 1 and the circulated air 11 passing through the green malt is adjusted, thereby approximating the absolute humidity of the blown air to the desired value.

Herein, in this case, the control is made so that the total of degrees of openings of the outside-air damper 2 and the circulated-air damper 12 is continuously 100%.

In the roasting-and-drying process, commonly, the absolute humidity of the outside air is lower, whereas the absolute humidity of the circulated air passing through the malt layer and containing moisture is higher. Accordingly, when the absolute humidity of the blown air is higher than a desired value, the control is performed such that the outside-air damper is opened wider and the circulated-air damper is narrowed; on the other hand, when it is less than the desired value, the control is performed such that the outside-air damper is narrowed and the circulated-air damper is opened wider.

(3) When the absolute humidity of the outside air 1 is already higher than a set value in summer, etc., the outside air is taken in by the outside-air damper 2 after the absolute humidity is lowered to a certain value by an air dryer (not shown in FIGS.).

As the above control method is adopted, air having the desired absolute humidity can be supplied to the green malt 10 continuously, and the amount of removed moisture can be constant, for example, by employing an air calculation (Mollier diagram), etc. Thus, the drying speed of green malt can be stabilized so as to achieve the stabilization of the quality.

EXAMPLES

Next, a specific example of a roasting-and-drying process implemented using a roasting-and-drying control method according to the present invention is illustrated with regard to case (a) of high absolute humidity of outside air and case (b) of low absolute humidity of outside air.

Case (a): High Absolute Humidity of Outside Air

For example, in the case of the air temperature of 25° C. and the relative humidity of 90%, the absolute humidity is 18.5 g/L.

As the outside air is taken in as it is and then heated up to, for example, 60° C. that is a roasting-and-drying temperature, by a heat exchanger, the absolute humidity is kept as it is and the conditions of the air, which is blown into the malt layer as blown air, are the temperature of 60° C. and the lowered relative humidity of 14%.

Then, the air rises in the room and absorbs moisture by removing the moisture from the green malt until the relative humidity becomes 95%, during passing through the malt layer.

The air in the room at this time has the temperature of 32° C., the relative humidity of 95%, and the absolute humidity of 30.0 g/L.

Accordingly, the moisture is removed from the malt by the increase of the absolute humidity of the air.

$$30.0-18.5=11.5\ \text{g/L}$$

Figure 3A:
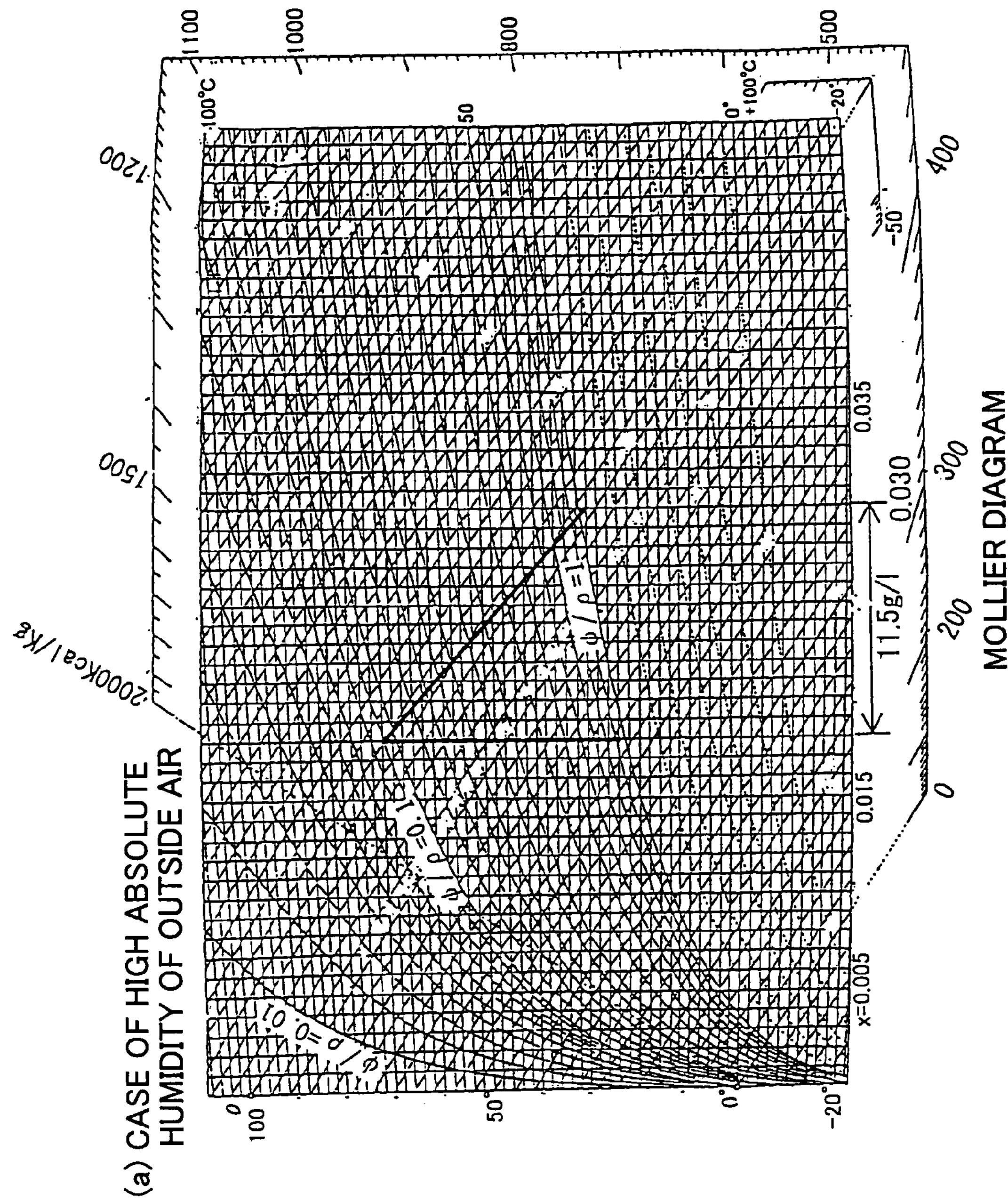
FIG. 3 is a diagram showing a process for obtaining the absolute humidity using a Mollier diagram.

Additionally, the value of the absolute humidity can be obtained using a Mollier diagram, and the example in this case is shown in FIG. 3A.

Thus, as the amount of moisture removed by air per 1 L of blown air is found, the amount of moisture removed from green malt per time, that is, the degree of drying, can be known by multiplying by the amount of the blown air.

On this occasion, when the set desired absolute humidity of the blown air is 15.0 g/L, the desired value is achieved by lowering the absolute humidity of the blown air by controlling an air dryer.

Case (b): Low Absolute Humidity of Outside Air

For example, in the case of the air temperature of 4° C. and the relative humidity of 60%, the absolute humidity is 3.0 g/L.

As the air is heated up to 60° C. similar to case (a) described above, the relative humidity is 2.5%. Furthermore, as the air passes through the malt layer and comes out from the room with the relative humidity of 95%, it has the temperature of 23° C., the relative humidity of 95%, and the absolute humidity of 17.5 g/L.

Accordingly, the moisture of 17.5−3.0=14.5 g/L is removed.

Figure 3B:
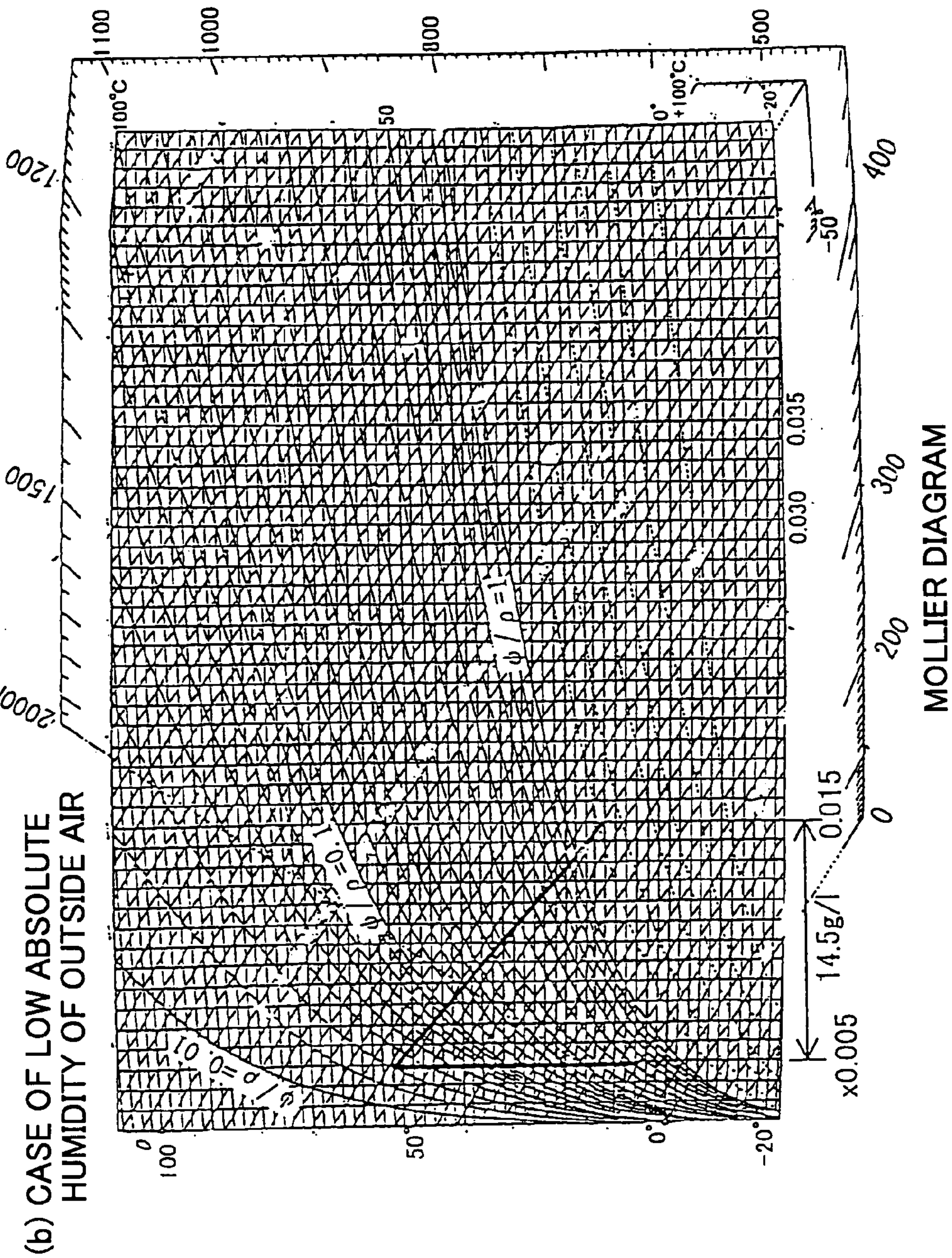

Additionally, FIG. 3B shows a process for obtaining the absolute humidity according to the Mollier diagram in this case.

As is found from the examples of cases (a) and (b) described above, when the absolute humidity of outside air differs, even if air with the same blown-air temperature is blown, the amount of moisture removed from a malt layer differs, and consequently, the degree of drying differs. Accordingly, a stable drying process can be obtained without the influence from daily variation due to season and weather by controlling the absolute humidity of blown air to be a desired value.

Additionally, in the case (b) described above, the absolute humidity of the outside air is 3.0 and the absolute humidity of the circulated air is 17.5, and at this time, when a set desired absolute value for the blown air is 15.0, as the mixing ratio of the outside air is denoted by×%, 3.0×+17.5 (100−×)=15.0×100, and thus×=17.2% is obtained.

That is, at time of the start of the control, the mixing ratio of the outside air starts at approximately 17%, then, the degrees of the openings of the dampers gradually vary, and the absolute humidity of the blown air is 15.0 at time of stabilizing, so that the absolute temperature of the circulated air passing through the malt layer is 27.0 and that of the outside air is 3.0, and the mixing ratio of the outside air becomes stable at approximately 50%.

Figure 4:
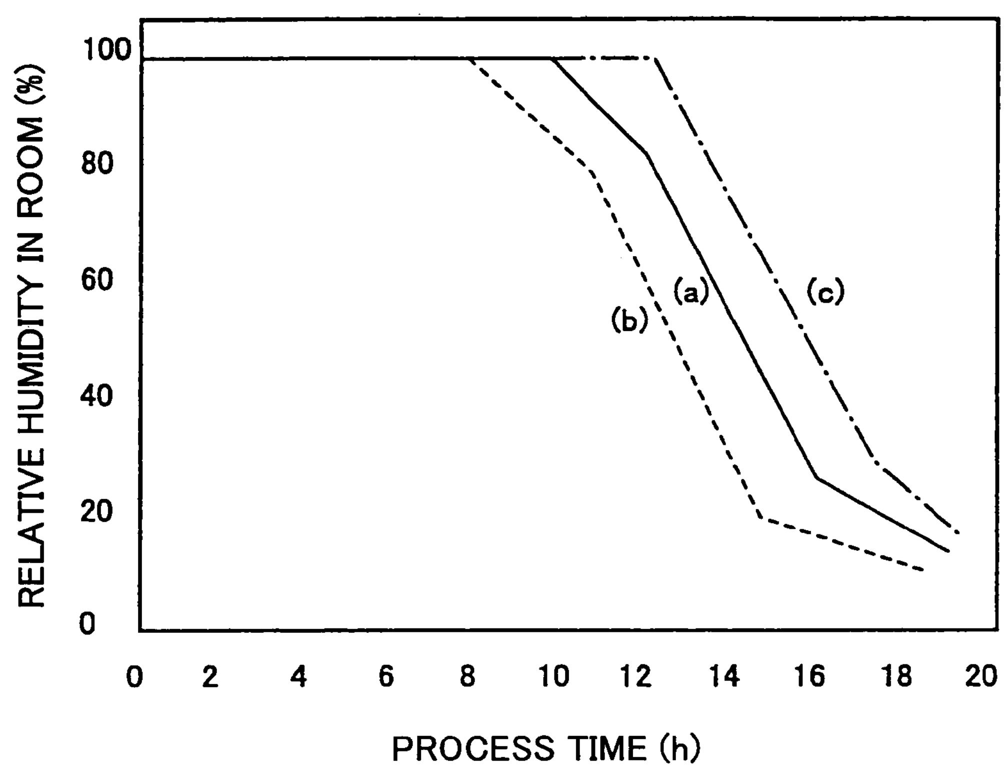
FIG. 4 is a graph showing a comparison of drying in roasting-and-drying processes.

FIG. 4 is a diagram showing a drying process in a roasting-and-drying process for green malt. The graph shows the variation of the relative humidity of the circulated air passing through the malt layer in the roasting-and-drying room, and shows that the relative humidity remains constant (for example, 95%) at the beginning of the roasting-and-drying process and when a certain time period has passed, the relative humidity lowers drastically, and a situation is provided such that drying is progressed. The graph shows case (a) of a standard drying process, case (b) of low absolute humidity and fast drying, and case (c) of high absolute temperature and slow drying. According to the present invention, the standard drying process can be achieved without the influence from the absolute humidity of outside air.

Additionally, the chromaticity of malt is raised mainly due to the coloring caused by a Maillard reaction between a sugar and an amino acid. Of course, it is influenced from the temperature of blown air (roasting-and-drying temperature). However, even if drying is made at the same temperature of blown air, the chromaticity varies dependent on the difference of the drying speed due to the difference of the absolute humidity.

For example, when drying is fast, the amount of moisture in green malt decreases rapidly, so that the Maillard reaction is reduced and the chromaticity of the malt lowers. (Herein, the more the moisture is, the more the Maillard reaction is accelerated.) Also, when drying is slowed, a condition is kept such that the amount of moisture in green malt is high, so that the Maillard reaction is increased and the chromaticity of the malt heightens.

As described above, according to the present invention, a roasting-and-drying period can be a set certain period, and roasted and dried malt with a stable quality, including the chromaticity of the malt, can be obtained.

As being apparent from the above detailed description, according to the method of controlling the absolute humidity of blown air of the present invention, since the amounts of outside air and circulated air are adjusted so that the absolute humidity of the blown air is kept to be a constant value, a stable drying situation can be achieved without the influence from the relative humidity of the outside air and roasted malt with a stable quality can be obtained.

Also, according to the roasting-and-drying apparatus of the present invention, air having the continuously stable absolute humidity can be fed to a malt raw material based on the absolute humidity of blown air fed to the malt raw material, and roasted malt with stable quality can be obtained.

The invention claimed is:

1. A roasting and drying method for roasting and drying a malt raw material, comprising the steps of:
- heaping raw malt material to form a malt raw material layer;
- circulating at least a portion of air having already passed through the malt raw material layer as circulated air;
- mixing at least a portion of the circulated air with heated outside air;
- feeding the mixture of circulated air and heated outside air to the malt raw material layer as blown air;
- measuring an absolute humidity of the blown air fed to the malt raw material layer; and
- controlling a mixing ratio of the outside air and circulated air so that the measured absolute humidity is kept at a predetermined value.

2. A roasting-and-drying apparatus for roasting and drying a malt raw material by heating outside air introduced toward the malt raw material from an underside of a heaped malt layer floor so as to be fed to the malt raw material as blown air and by mixing a portion of air passing through the malt raw material as circulated air with the outside air so as to be fed to the malt raw material as blown air again, comprising:
- an outside-air damper for adjusting an introduction amount of the outside air;
- a circulated-air damper for dividing the circulated air passing through the malt raw material into air exhausted outside and recycled air;
- a humidity sensor for measuring an absolute humidity of the blown air fed to the malt raw material; and
- a control device for controlling a mixing ratio of the introduced outside air and the circulated air so that the measured absolute humidity is kept at a predetermined value.

3. The roasting-and-drying apparatus as claimed in claim 2, wherein the control device controls the outside-air damper and the circulated-air damper so that a sum of the introduced outside air and the recycled air is continuously constant.

4. A roasting-and-drying apparatus for roasting and drying a malt raw material by heating outside air introduced toward the malt raw material from an underside of a heaped malt layer floor so as to be fed to the malt raw material as blown air and by mixing a portion of air passing through the malt raw material as circulated air with the outside air so as to be fed to the malt raw material as the blown air again, comprising:

an outside-air damper for adjusting an introduction amount of the outside air;

a circulated-air damper for dividing the circulated air passing through the malt raw material into air exhausted outside and recycled air;

a humidity sensor for measuring an absolute humidity of the blown air fed to the malt raw material; and control means for controlling a mixing ratio of the introduced outside air and the circulated air so that the measured absolute humidity is kept at a predetermined value.

5. The roasting-and-drying apparatus as claimed in claim 4, wherein the control means controls the outside-air damper and the circulated-air damper so that a sum of the introduced outside air and the recycled air is continuously constant.

* * * * *